United States Patent
Warke et al.

(10) Patent No.: US 9,240,900 B2
(45) Date of Patent: Jan. 19, 2016

(54) WIRELESS ROUTER SYSTEM

(75) Inventors: Nirmal C. Warke, Irving, TX (US); Brad Kramer, Plano, TX (US); Hassan Ali, Murphy, TX (US); Swaminathan Sankaran, Plano, TX (US); Baher Haroun, Allen, TX (US); Srinath Hosur, Plano, TX (US); Martin J. Izzard, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1170 days.

(21) Appl. No.: 13/226,133

(22) Filed: Sep. 6, 2011

(65) Prior Publication Data

US 2013/0058329 A1 Mar. 7, 2013

(51) Int. Cl.
*H04L 12/50* (2006.01)
(52) U.S. Cl.
CPC ...................................... *H04L 12/50* (2013.01)
(58) Field of Classification Search
None
See application file for complete search history.

(56) References Cited

U.S. PATENT DOCUMENTS

| | | |
|---|---|---|
| 5,754,948 A | 5/1998 | Metze |
| 6,967,347 B2 | 11/2005 | Estes et al. |
| 7,330,702 B2 | 2/2008 | Chen et al. |
| 7,373,107 B1 | 5/2008 | Wesolowski |
| 7,379,713 B2 | 5/2008 | Lindstedt |
| 7,768,457 B2 | 8/2010 | Pettus et al. |
| 2002/0105966 A1* | 8/2002 | Patel et al. .................. 370/463 |
| 2003/0102942 A1* | 6/2003 | Aikawa et al. ............... 333/204 |
| 2004/0203528 A1* | 10/2004 | Ammar et al. ............... 455/90.3 |
| 2009/0009408 A1 | 1/2009 | Rofougaran |
| 2009/0028177 A1 | 1/2009 | Pettus et al. |
| 2011/0009078 A1* | 1/2011 | Kawamura .................. 455/101 |
| 2011/0075581 A1* | 3/2011 | Mihota ........................ 370/252 |

* cited by examiner

*Primary Examiner* — Chirag Shah
*Assistant Examiner* — Joshua Smith
(74) *Attorney, Agent, or Firm* — John R. Pessetto; Frank D. Cimino (57) ABSTRACT

Conventional routers employ a wired backplane that employs "long reach" serializer/deserializer (SerDes) links, but this type of architecture is complicated, costly, and uses a considerable amount of power. To address some of these issues, a new wireless backplane architecture is provided here. This wireless backplane employs direct millimeter wave links between line cards that replaces the convention, wired switching fabric.

2 Claims, 12 Drawing Sheets

WIRELESS ROUTER SYSTEM

TECHNICAL FIELD

The invention relates generally to a router and, more particularly, to router having a wireless switching fabric.

BACKGROUND

Figure 1:
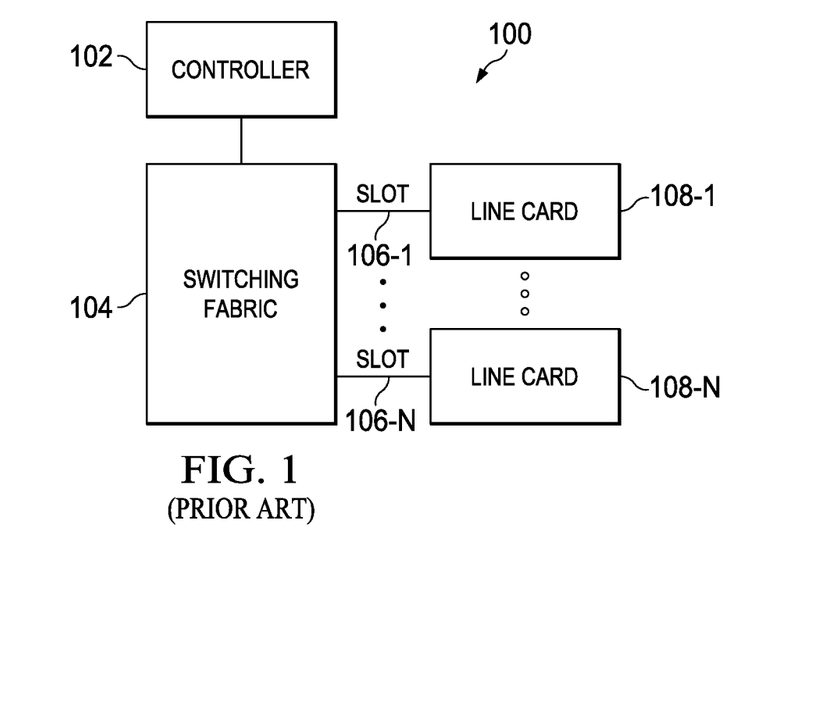
FIG. 1 is a diagram of an example of a conventional router.
Figure 2:
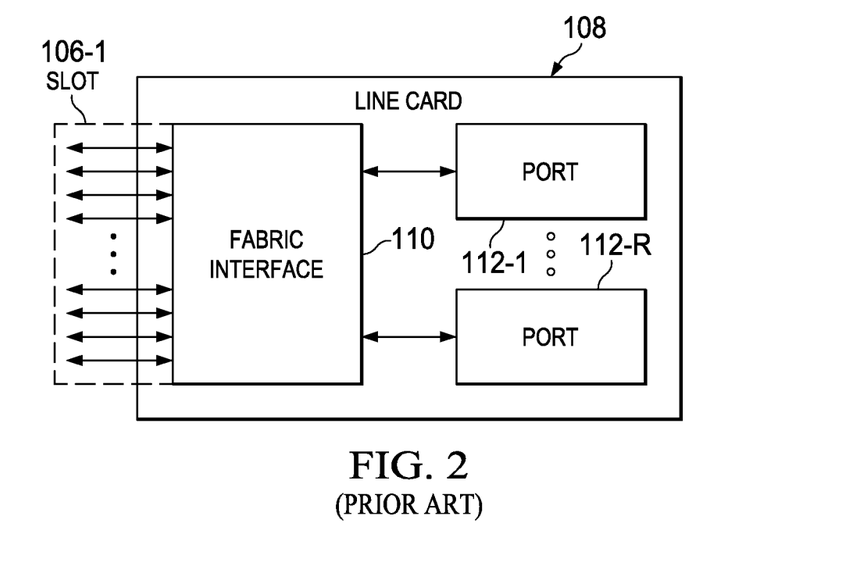
FIG. 2 is a diagram of a line card for the router of FIG. 1.

Turning to FIGS. 1 and 2, a diagram of a example of a conventional router 100 can be seen. This router 100 is generally housed within a chassis that includes a wired switching fabric 104 (which is generally comprised of "long reach" serializer/deserializer (SerDes) links) which is controlled by a controller 102. These "long reach" SerDes links can be up to several feet in length, are complex in construction, and consume a large amount of power. Coupled (through slots 106-1 to 106-N) to the this switching fabric 104 (which is part of "backplane" of the router 100) are line card 108-1 to 108-N. These line cards 108-1 to 108-2 (labeled 108 in FIG. 2 for the sake of simplicity) generally include a fabric interface 110 that communicates with the fabric 104 through slots 106-1 to 106-N (labeled 106 in FIG. 2 for the sake of simplicity) and ports 112-1 to 112-R that communicate with the interface 110 over "short reach" SerDes links. The ports 112-1 to 112-R generally include Ethernet connections (i.e., through RJ45 connectors).

This conventional arrangement has numerous drawbacks. Principally, the backplane (which includes the switching fabric 104) is complex, expensive, and consumes a large amount of power. Thus, there is a need to for improved router backplanes.

Some examples of conventional systems are: U.S. Pat. No. 5,754,948; U.S. Pat. No. 6,967,347; U.S. Pat. No. 7,330,702; U.S. Pat. No. 7,373,107; U.S. Pat. No. 7,379,713; U.S. Pat. No. 7,768,457; U.S. Patent Pre-Grant Publ. No. 2009/0009408; and U.S. Patent Pre-Grant Publ. No. 2009/0028177.

SUMMARY

A preferred embodiment of the present invention, accordingly, provides an apparatus. The apparatus comprises a printed circuit board (PCB); a plurality of ports that are each secured to the PCB; a forwarding circuit that is secured to PCB, wherein the forwarding circuit is in communication with each of the plurality of ports; and a plurality of input/output (IO) circuits, wherein each IO circuit is secured to the PCB and is in communication with the forwarding circuit, and wherein each IO circuit is configured to provide a millimeter wave link in a direction extending from the PCB, and wherein the plurality of IO circuits are arranged on the PCB and spaced apart from one another so as to isolate each millimeter wave link.

In accordance with an embodiment of the present invention, the forwarding circuit is in communication with the plurality of ports by a first set of serializer/deserializer (SerDes) links, and wherein the forwarding circuit is in communication with the plurality of IO circuits by a second set of SerDes links.

In accordance with an embodiment of the present invention, the PCB further comprises a top surface and a bottom surface, and wherein the millimeter wave link for each IO circuit further comprises: a first transmit link that is configured to transmit data to a receiver facing the top surface of the PCB; a first receive link that is configured to receive data from a transmitter facing the top surface of the PCB; a second transmit link is configured to transmit data to a receiver facing the bottom surface of the PCB; and a second receive link that is configured to receive data from a transmitter facing the bottom surface of the PCB.

In accordance with an embodiment of the present invention, each IO circuit further comprises a transceiver that is secured to the top surface of the PCB, that is communication with the forwarding circuit, and that provides the first transmit link and the first receive link.

In accordance with an embodiment of the present invention, the PCB further comprises a plurality of radio frequency (RF) windows, wherein each RF window is substantially aligned with the transceiver from at least one of the IO circuits so that the transceiver provides the second transmit link and the second receive link.

In accordance with an embodiment of the present invention, each IO circuit further comprises a relay circuit that is secured to the bottom surface of the PCB, that is in communication with the forwarding circuit, and that provides the second transmit link and the second receive link.

In accordance with an embodiment of the present invention, the transceiver from each IO circuit further comprises a phased array.

In accordance with an embodiment of the present invention, an apparatus is provided. The apparatus comprises a chassis having a first slot and a second slot; a first active card that is secured to the first slot, wherein the first active card includes: a first PCB; a first set of ports that are each secured to the first PCB; a first forwarding circuit that is secured to first PCB, wherein the first forwarding circuit is in communication with each port from the first set of ports; and a first set of IO circuits, wherein each IO circuit from the first set is secured to the first PCB and is in communication with the first forwarding circuit, and wherein the first set of IO circuits are arranged on the first PCB and spaced apart from one another by at least a first distance; and a second active card that is secured to the second slot and that is separated from the first active card by a second distance, wherein the second active card includes: a second PCB; a second set of ports that are each secured to the second PCB; a second forwarding circuit that is secured to second PCB, wherein the second forwarding circuit is in communication with each port from the second set of ports; and a second set of IO circuits, wherein each IO circuit from the second set is secured to the second PCB and is in communication with the second forwarding circuit, and wherein the second set of IO circuits are arranged on the second PCB and spaced apart from one another by at least the first distance, and wherein each IO circuit from the first set is substantially aligned with an IO circuit from the second set so as to provide a millimeter wave link between each pair of aligned IO circuits, and wherein the first distance and the second distance are sufficiently large to isolate the millimeter wave link between each pair of IO circuits.

In accordance with an embodiment of the present invention, the chassis further comprises: a rack that includes the first and second slots; and a routing processor that is in communication with the first and second forwarding circuits.

In accordance with an embodiment of the present invention, the first forwarding circuit is in communication with the first set of ports by a first set of SerDes links, and wherein the first forwarding circuit is in communication with the first set of IO circuits by a second set of SerDes links, and wherein the second forwarding circuit is in communication with the second set of ports by a third set of SerDes links, and wherein the second forwarding circuit is in communication with the second set of IO circuits by a fourth set of SerDes links.

In accordance with an embodiment of the present invention, the each of the first and second PCBs further comprises a top surface and a bottom surface, and wherein the millimeter wave link for each pair of aligned IO circuits further comprises a transmit link and a receive link.

In accordance with an embodiment of the present invention, each IO circuit from the first and second sets further comprises a transceiver that is secured to the top surface of its PCB and that is communication with its forwarding circuit.

In accordance with an embodiment of the present invention, the bottom surface of the first PCB faces the top surface of the second PCB, and wherein the first PCB further comprises a plurality of RF windows, and wherein each RF window is substantially aligned with the transceiver from at least one of the IO circuits from the first set.

In accordance with an embodiment of the present invention, each IO circuit from the first set further comprises a relay circuit that is secured to the bottom surface of the first PCB, which is in communication with the first forwarding circuit.

In accordance with an embodiment of the present invention, an apparatus is provided. The apparatus comprises a chassis having a rack with a plurality of slots; a plurality of line cards that are arranged in a sequence, wherein each line card is secured to at least one of the slots and separated by a first distance, wherein each line card includes: a PCB; and a set of IO circuits, wherein each IO circuit from the set is secured to the PCB, and wherein each IO circuit set is substantially aligned with a corresponding IO circuit from an adjacent line card so as to provide a millimeter wave link between each aligned pair of IO circuits, and wherein the set of IO circuits are arranged on the PCB and spaced apart from one another by at least a first distance, and wherein the first distance and the second distance are sufficiently large to isolate the millimeter wave link between each pair of IO circuits.

In accordance with an embodiment of the present invention, at least one of the line cards further comprises an active card having a forwarding circuit that is secured to its PCB and that is communication with its ports and its IO circuits.

In accordance with an embodiment of the present invention, at least one of the line cards is a relay card.

In accordance with an embodiment of the present invention, the chassis further comprise a plurality of waveguides, wherein each waveguide is substantially aligned with at least one IO circuit from each of the first and last line cards.

In accordance with an embodiment of the present invention, an apparatus is provided. The apparatus comprises a printed circuit board (PCB) having: a top surface; a bottom surface; and a plurality of serializer/deserializer (SerDes) lanes; an input/output (IO) circuit having a transceiver that is secured to the top surface of the PCB, wherein transceiver includes: a SerDes circuit that is coupled to the plurality of SerDes lanes; an intermediate circuit that is coupled to the SerDes circuit; a transmitter that is coupled to the intermediate circuit; a receiver that is coupled to the intermediate circuit; and an antenna that is coupled to the transmitter and the receiver, wherein the transmitter and the antenna are configured to provide a millimeter wave transmit link at a first frequency in a direction that extends from the top surface of the PCB, and wherein the receiver and the antenna are configured to provide a millimeter receive link at a second frequency in the direction that extends from the top surface of the PCB.

In accordance with an embodiment of the present invention, the millimeter wave transmit and receive links further comprise a first millimeter wave transmit link and a first millimeter wave receive link, and wherein the PCB further comprises a radio frequency (RF) window that is substantially aligned with the transceiver, wherein the transmitter and antenna are configured to provide a second millimeter wave transmit link in a direction that extends from the bottom surface of the PCB, and wherein the receiver and antenna are configured to provide a second millimeter wave receive link in the direction that extends the bottom surface of the PCB.

In accordance with an embodiment of the present invention, the millimeter wave transmit and receive links further comprise a first millimeter wave transmit link and a first millimeter wave receive link, and wherein the IO circuit further comprises a relay circuit that is secured to the bottom surface of the PCB and that is substantially aligned with the transceiver, wherein the relay circuit is configured to provide a second millimeter wave receive link in the direction that extends from the bottom surface of the PCB.

In accordance with an embodiment of the present invention, the SerDes circuit further comprises a serializer and a deserializer.

In accordance with an embodiment of the present invention, the intermediate circuit further comprises: a lane aggregation circuit that is coupled between the serializer and the transmitter; and a lane de-aggregation circuit that is coupled between the receiver and the deserializer and that is coupled to the lane aggregation circuit.

In accordance with an embodiment of the present invention, the SerDes circuit, the intermediate circuit, the transmitter, the receiver, and the antenna further comprise a first SerDes circuit, a first intermediate circuit, a first transmitter, a first receiver, and a first antenna, and wherein the relay circuit further comprises: a second SerDes circuit; a second intermediate circuit that is coupled to the second SerDes circuit; a second transmitter that is coupled to the second intermediate circuit; a second receiver that is coupled to the second intermediate circuit; and a second antenna that is coupled to the second transmitter and the second receiver.

In accordance with an embodiment of the present invention, the serializer and the deserializer further comprise a first serializer and a first deserializer, and wherein the second SerDes circuit further comprises a second serializer and a second deserializer.

In accordance with an embodiment of the present invention, the intermediate circuit further comprises: a multiplexer that is coupled between the second serializer and the second transmitter; and a demultiplexer that is coupled between the second receiver and the second deserializer.

In accordance with an embodiment of the present invention, an apparatus is provided. The apparatus comprises a PCB having: a top surface; a bottom surface; and a plurality of SerDes lanes; an IO circuit having: an integrated circuit (IC) having: a SerDes circuit; an intermediate circuit that is coupled to the SerDes circuit; a transmitter that is coupled to the intermediate circuit; and a receiver that is coupled to the intermediate circuit; an antenna package that is secured to the top surface of the PCB, wherein the IC is secured to the antenna package and is communication with the plurality of SerDes lanes through the antenna package, and wherein the transmitter and the antenna package are configured to provide a millimeter wave transmit link at a first frequency in a direction that extends from the top surface of the PCB, and wherein the receiver and the antenna package are configured to provide a millimeter receive link at a second frequency in the direction that extends from the top surface of the PCB.

In accordance with an embodiment of the present invention, the antenna package further comprises a plurality of antennas arranged to operate as a phased array.

In accordance with an embodiment of the present invention, the antenna package further comprises a high impedance surface (HIS) that substantially surrounds the plurality of antennas.

In accordance with an embodiment of the present invention, the IC and antenna package further comprise a first IC and a first antenna package, and wherein the SerDes circuit, the intermediate circuit, the transmitter, and the receiver further comprise a first SerDes circuit, a first intermediate circuit, a first transmitter, and a first receiver, and wherein the millimeter wave transmit and receive links further comprise first millimeter wave transmit and receive links, and wherein the IO circuit further comprises: a second IC having: a SerDes circuit; an intermediate circuit that is coupled to the SerDes circuit; a transmitter that is coupled to the intermediate circuit; and a receiver that is coupled to the intermediate circuit; and a second antenna package that is secured to the bottom surface of the PCB, and wherein the second transmitter and the second antenna package are configured to provide a second millimeter wave transmit link at the second frequency in a direction that extends from the bottom surface of the PCB, and wherein the receiver and the antenna package are configured to provide a second millimeter receive link at the first frequency in the direction that extends from the bottom surface of the PCB.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 3:
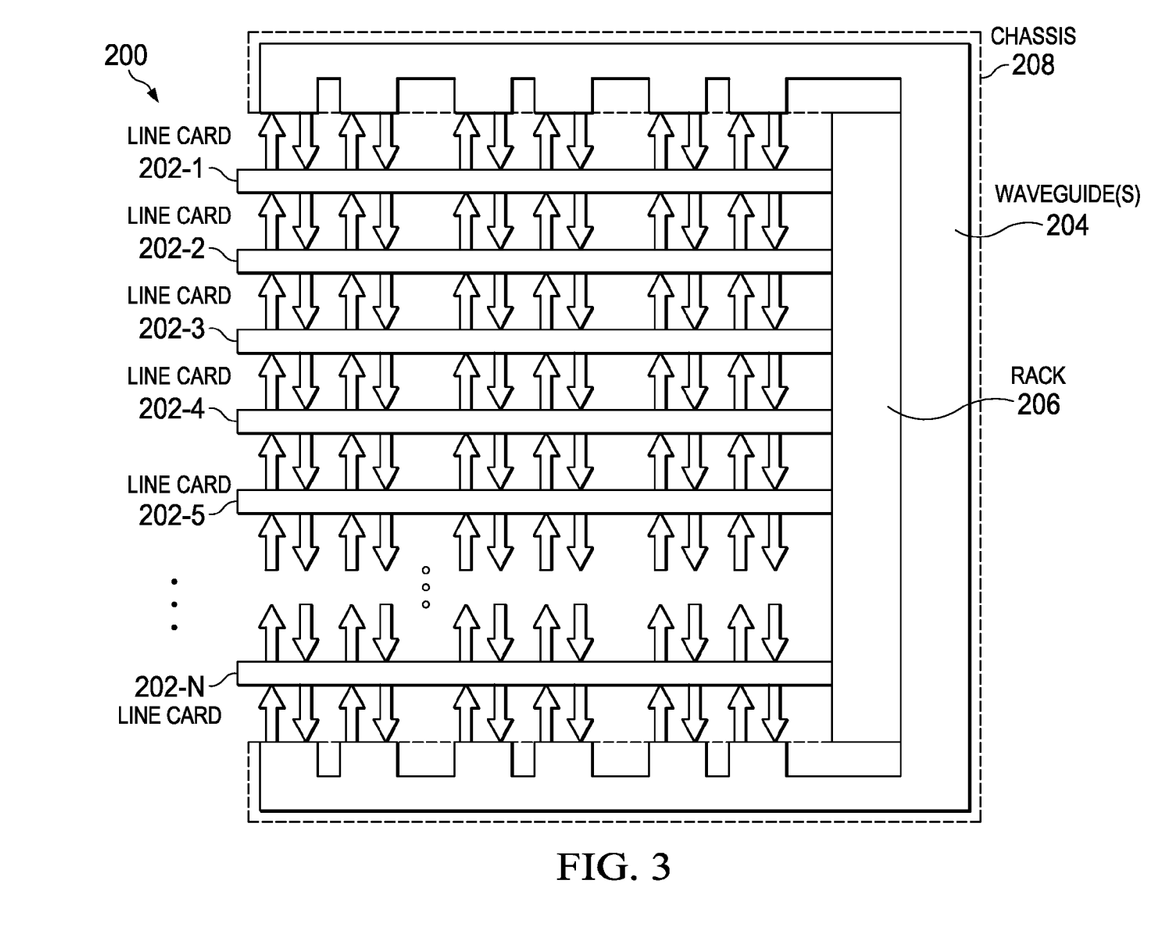
FIG. 3 is a diagram of an example of a router in accordance with an embodiment of the present invention.

Turning to FIG. 3, an example of a router 200 in accordance with an embodiment of the present invention can be seen. As shown, communication between line cards 202-1 to 202-N is provided through wireless millimeter wave links (i.e., between 100 GHz and 10 THz) instead of through "long reach" SerDes links. Each card 202-1 to 202-N is secured within a rack 206 (which is part of the router chassis 208). The rack 206 is able to power each of the line cards 202-1 to 202-N and to provide controls from a processor (i.e., controller 102 of FIG. 1). Each card 102-1 to 102-N is able to provide multiple transmit and receive links to its adjacent line cards. Additionally, a waveguide (or many waveguides) can be included within chassis 208 to allow the first line card 202-1 to the last line card 202-N.

Figure 4:
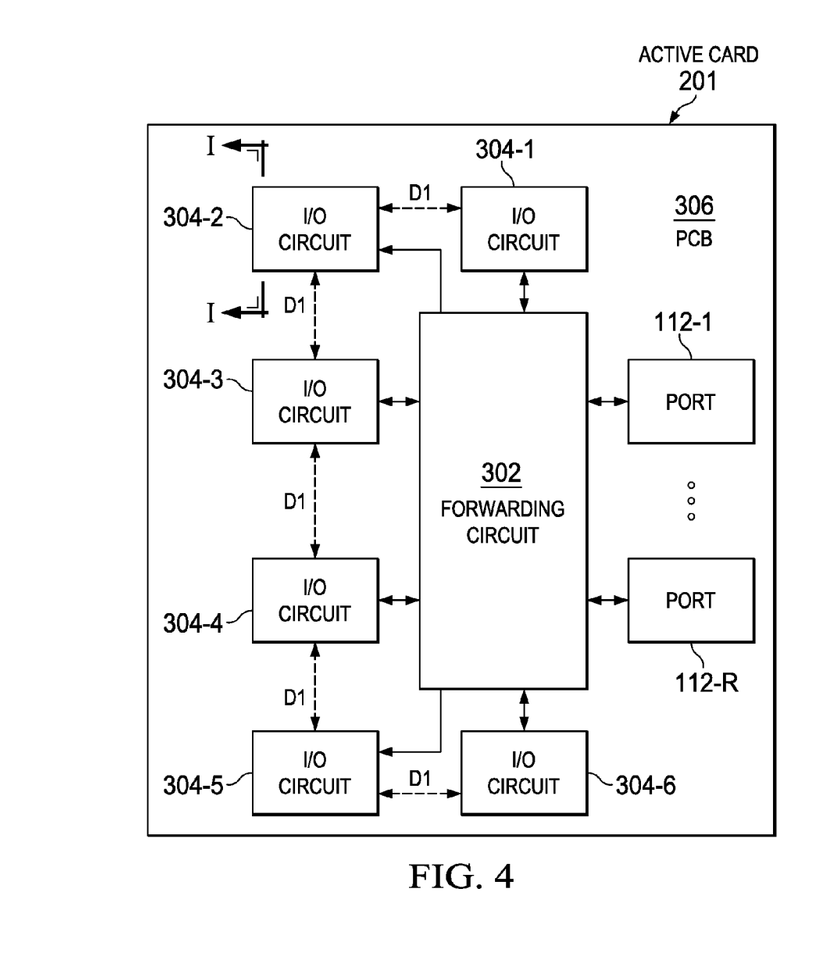
FIG. 4 is a diagram of an example of an active card for the router of the FIG. 3.
Figure 5:
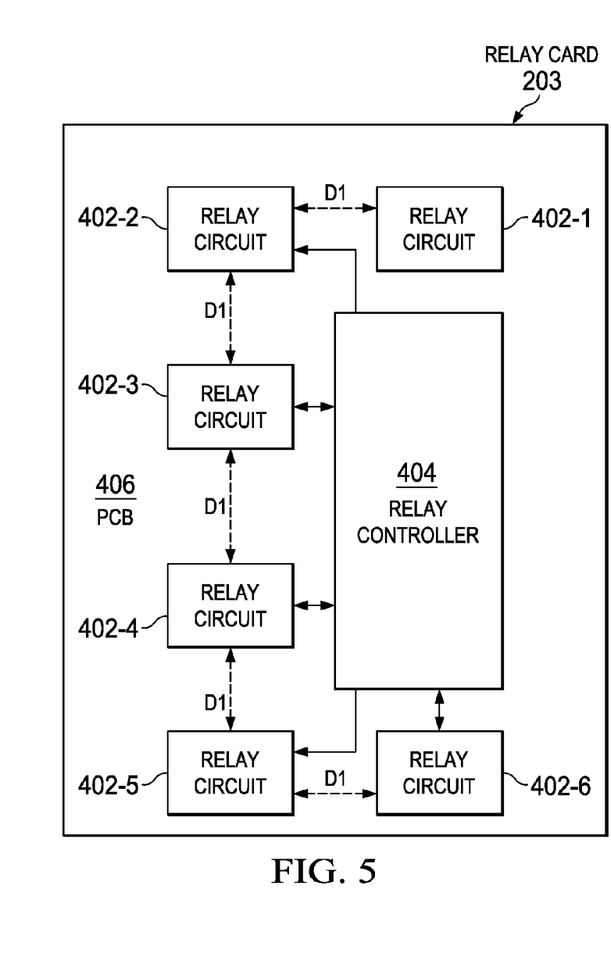
FIG. 5 is a diagram of an example of a relay card for the router of FIG. 3.

In order to be able to create these wireless millimeter wave links, the line cards 202-1 to 202-N should be arranged in a manner in which the links do not interfere with one another, which can be seen in FIGS. 4 and 5. As shown, two different types of line cards 202-1 and 202-N can be employed: active cards 201 and relay cards 203. Active cards 201 are generally include ports 112-1 to 112-R, whereas relay cards 203. This allows for the assembly of a lower cost router 200, where some active cards 201 are replaced with relay cards 203, allowing the millimeter wave links are present so as to generally maintain the same functionality. Active cards 201 are generally comprised of IO circuits 304-1 to 304-6 (more may be included) that are secured to the printed circuit board (PCB) 306 and spaced apart from one another by a distance D1 such that the transmit and receive links for adjacent IO circuits (i.e., IO circuit 304-1 and 304-2) do not interfere with one another. Each of these IO circuits 304-1 to 304-6 is coupled to a forwarding circuit 302 over "short reach" SerDes links (which can include multiple SerDes lanes). The forwarding circuit 302 is also coupled to ports 112-1 to 112-R. The relay card 203, on the other hand, has relay circuits 402-1 to 402-6 that are secured to PCB 406 and arranged in a similar manner to IO circuits 304-1 to 304-6. These relay circuits 402-1 to 402-6 are also coupled to a relay controller 404 over "short reach" SerDes links.

Figure 6:
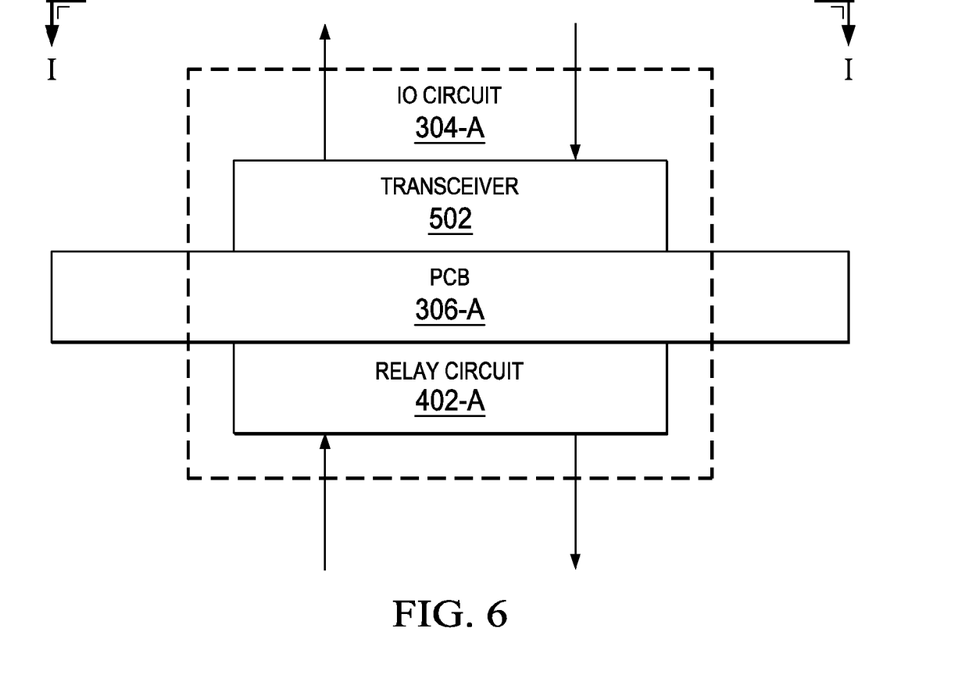
FIGS. 6 and 7 are cross-sectional view of the active card of FIG. 4 along section line I-I.

Turning to FIG. 6, an example arrangements for IO circuit 304 (labeled 304-A for FIG. 6) can be seen. As shown, IO circuit 304-A id generally comprised of a transceiver 502 secured to the top surface of the PCB 306-A and a relay circuit 402-A secured to the bottom surface of PCB 306-A. Each of the transceiver 502 and relay circuit 402-A is coupled to the forwarding circuit 302 over "short reach" SerDes links and each has a transmit link and a receive link that extend from the top and bottom surfaces of the PCB 306-A, respectively. The transmit and receive links are also usually at different frequencies to avoid interference. For example, the transmit link and receive link for transceiver 502 and be 160 GHz and 120 GHz, respectively, and the transmit and receive links for relay circuit 402-A can be 120 GHz and 160 GHz, respectively. Additionally, for relay card 203, relay circuits (i.e., 404-1) are secured to the top surface and bottom surface of PCB 406 in a similar arrangement.

Figure 7:
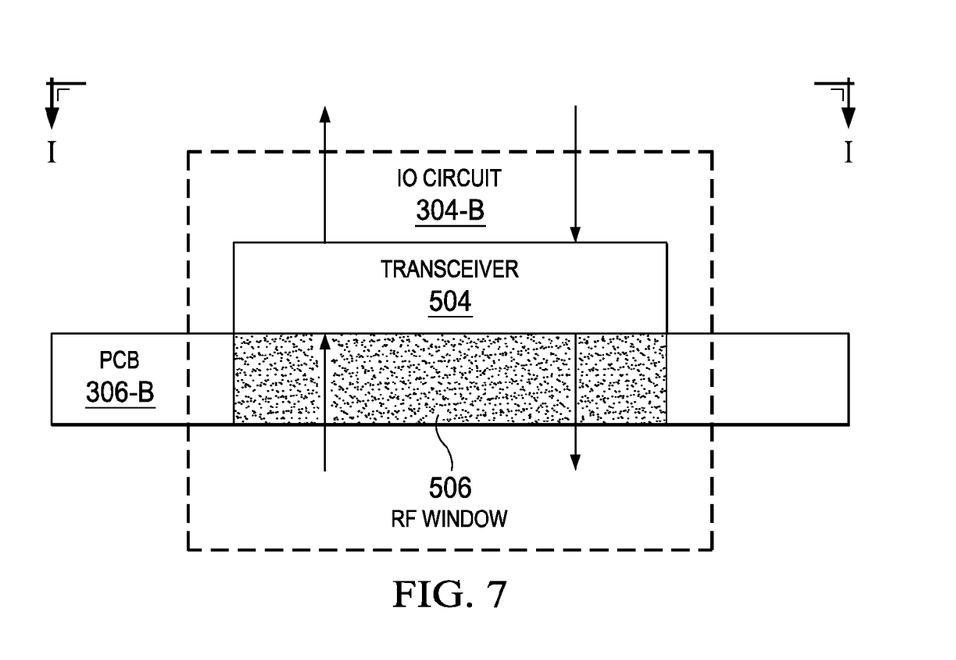

Another approach (as shown in FIG. 7) is to employ transceiver 504 in IO circuit 304-B. For this example, transceiver 504 provides transmit and receive links that extend from both the top and bottom surfaces of the PCB 306-B. For the transmit and receive links extending from the top surface of the PCB 306-B, transceiver 504 function in a similar manner to transceiver 502, but, because PCBs (i.e., PCB 306-B) often include layers that are reflective or opaque to millimeter wave radiation, the PCB 306-B is configured to be roughly transparent. This is accomplished by having a radio frequency (RF) window 506 positioned below or aligned with transceiver 504. In this RF window 506, openings are formed in layers that are opaque or reflective to millimeter wave radiation so as to allow the transceiver to form transmit and receive links that extend from the bottom surface of the PCB 306-B.

Figure 8:
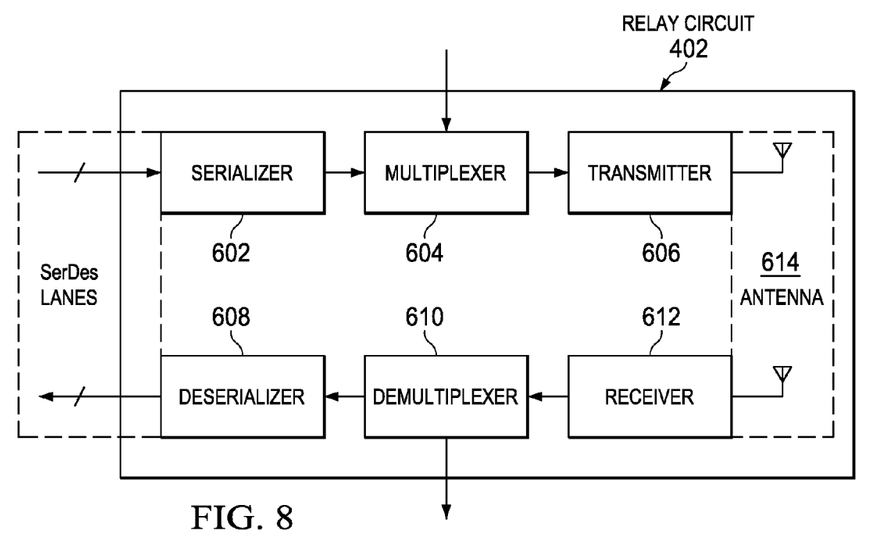
FIG. 8 is a diagram of an example of the relay circuit of FIG. 6.

Turning to FIG. 8, a diagram of an example of a relay circuit 402 can be seen. In this example, the relay circuit 402 is generally comprised of a SerDes circuit (which generally includes a serializer 602 and deserializer 608), an intermediate circuit (which generally includes multiplexer 604 and demultiplexer 610), a transmitter 606, a receiver 612, and an antenna 614. Typically, the SerDes circuit is coupled to SerDes lanes so as to communicate (i.e., provide and receive data packets) with a forwarding circuit 302 or relay controller 404. The multiplexer 604 and demultiplexer 610 are also controlled by the forwarding circuit 302 or relay controller 404 so as to control the data flow from the receiver 612 and to transmitter 606.

Figure 9:
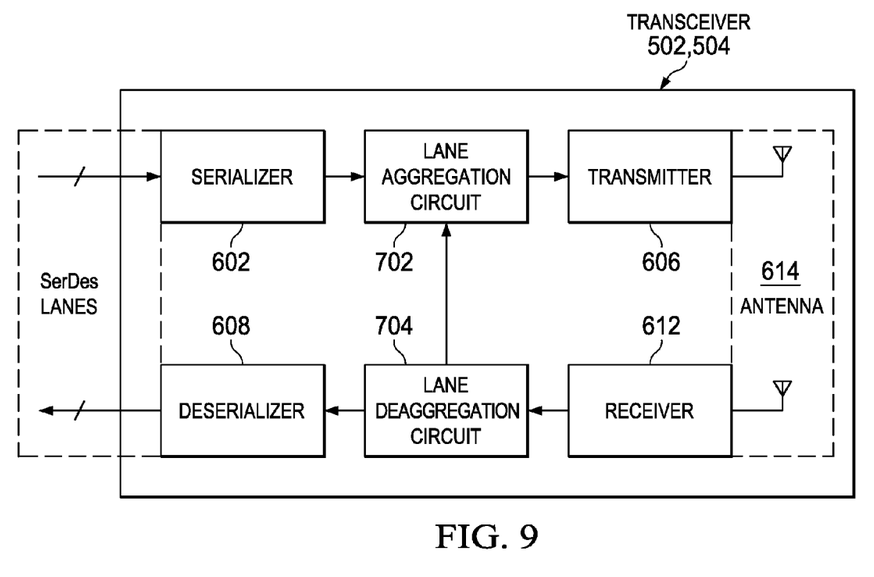
FIG. 9 is a diagram of an example of the transceiver of FIG. 6.

In FIG. 9, a diagram of an example of the transceiver 502 or 504 can be seen. This transceiver 502 or 504 is generally comprised of a SerDes circuit (which generally includes a serializer 602 and deserializer 608), an intermediate circuit (which generally includes lane aggregation circuit 702 and lane de-aggregation circuit 704), a transmitter 606, a receiver 612, and an antenna 614. The lane aggregation circuit 702 and lane de-aggregation circuit 704 are typically coupled to the transmitter 606 and receiver 612 via a high speed serial interface and coupled to the SerDes circuit through a low speed parallel interface. This allows data to be communicated to and from the forwarding circuit 302 over SerDes lanes.

Figure 10:
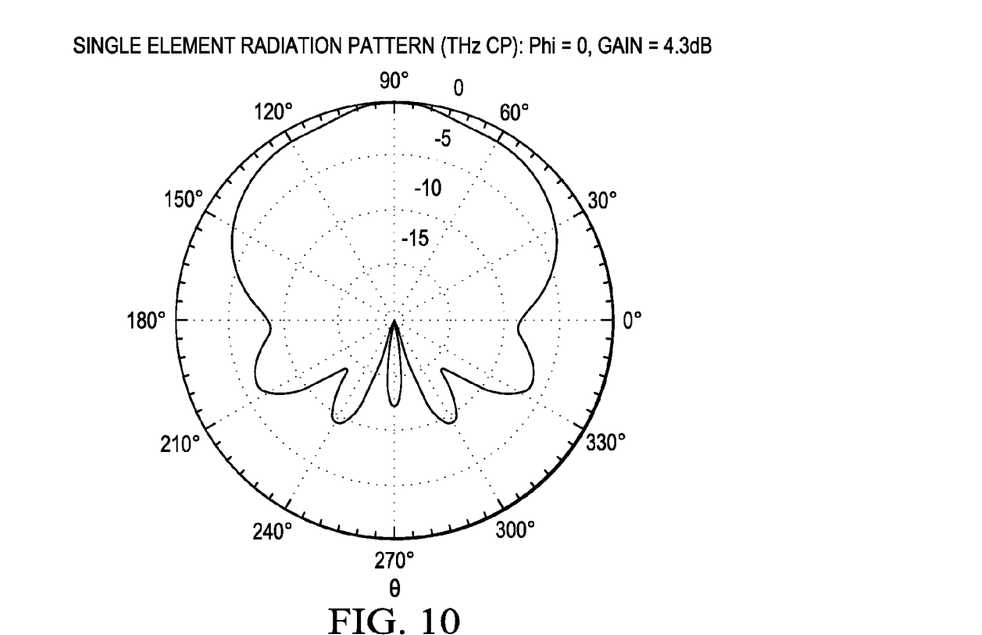
FIGS. 10 and 11 are radiation patterns for a single antenna for the relay circuit and transceiver of FIGS. 8 and 9.
Figure 11:
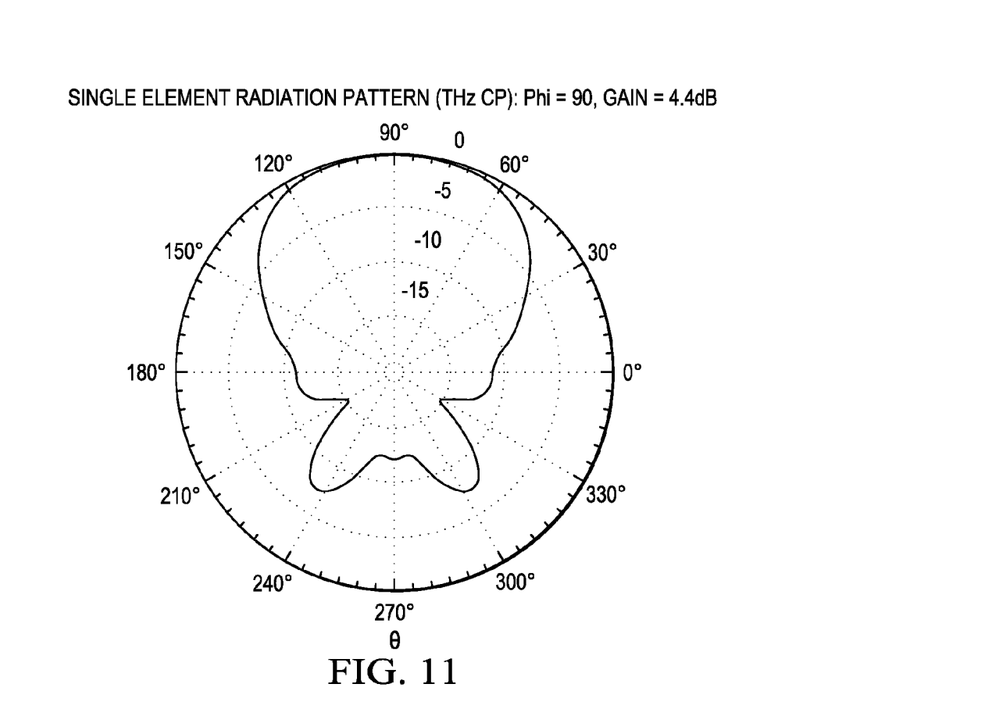

One important characteristic (which was mentioned above) is the spacing of the IO circuits 304-1 to 304-6 and/or relay circuits 402-1 to 402-6. This spacing is typically premised on the shape of the beam formed by antenna (i.e., antenna 614). Turning to FIGS. 10 and 11, examples of the radiation patterns for single antennas can be seen. As shown, these beams are fairly wide. This means that the distance D1 may be on the order of 2.5-inches or more, but, to achieve narrower spacing, a phased array can be employed.

Figure 12:
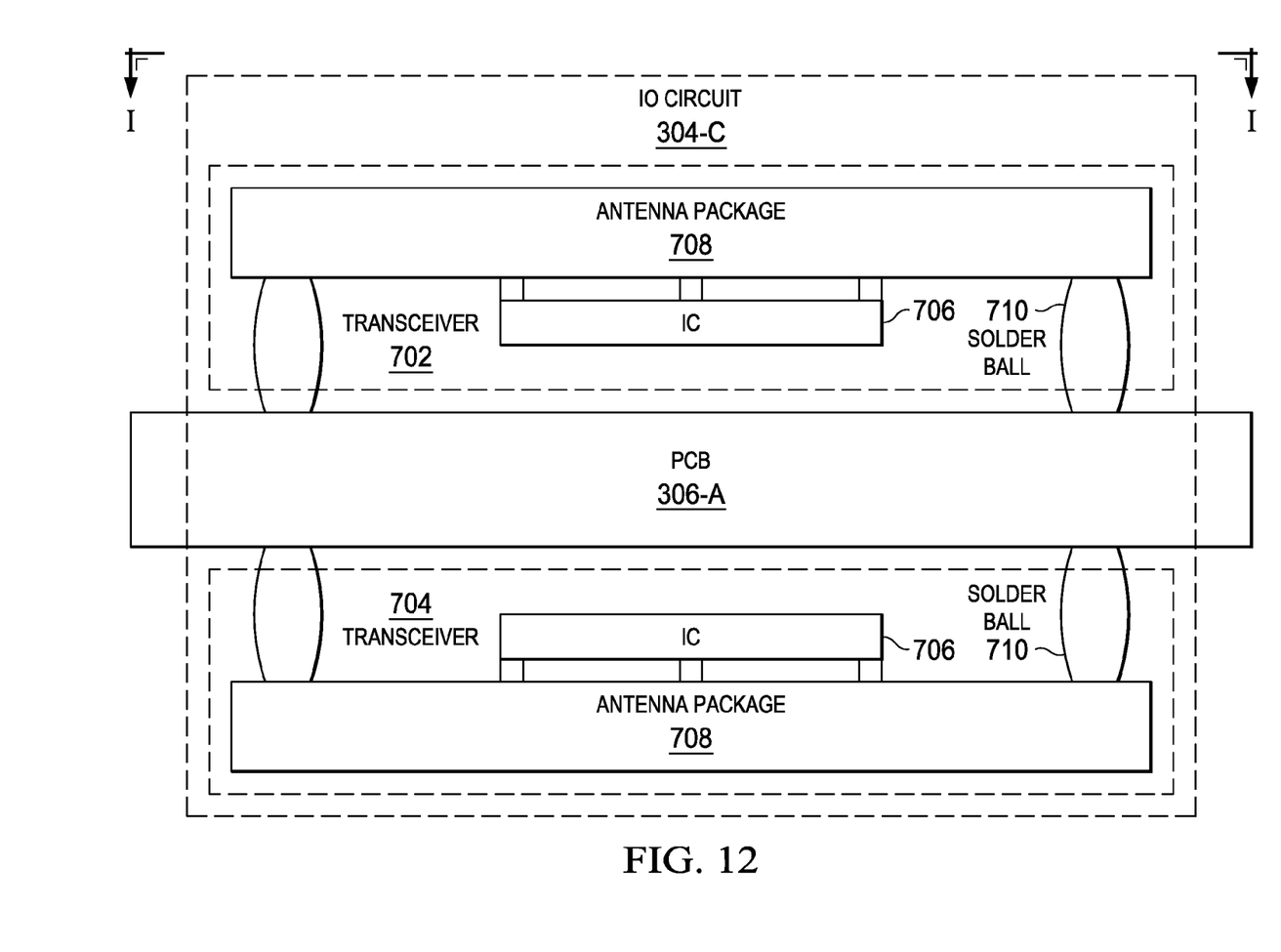
FIG. 12 is a cross-sectional view of the active card of FIG. 4 along section line I-I.

As shown in the example of FIG. 12, phased array transceivers 702 and 704 can be employed in IO circuit 304-C. These transceiver 702 and 704 are each generally comprised of a integrated circuit 706 and antenna package 708. For example, IC 706 can be a terahertz or millimeter wave phased array system that includes multiple transceiver circuits. An example of such an IC can be seen in co-pending U.S. patent application Ser. No. 12/878,484, which is entitled "Terahertz Phased Array System," filed on Sep. 9, 2010, and is hereby incorporated by reference for all purposes. This IC 706 is then secured to the antenna package 708 to allow each transceiver (for example) to communicate with a transceiver antenna included on the antenna package 708. The antenna package 708 is then secured to the PCB 306-A with solder balls 710 to allow the IC 706 to communicate with the forwarding circuit 302 through the antenna package 708. Alternatively, IC 706 and antenna package 708 can form relay circuit 402 so that other, alternative configurations (such as relay card 203) can be formed.

Figure 13:
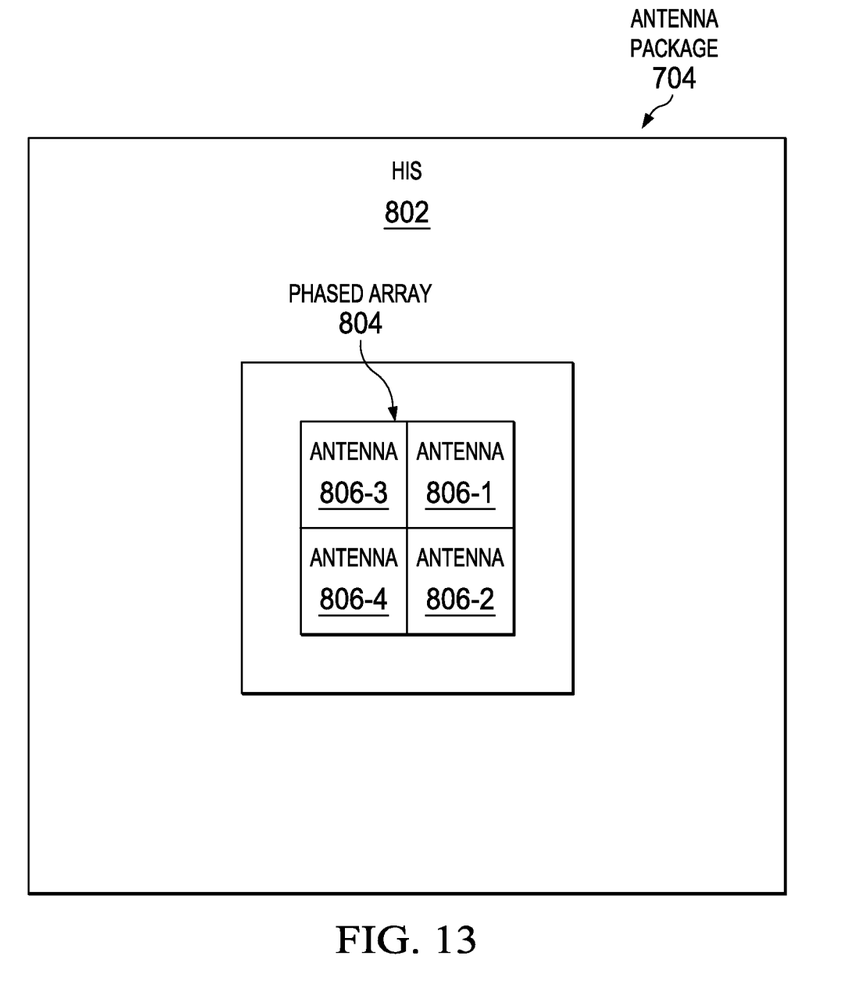
FIG. 13 is a plan view of the antenna package of FIG. 12.
Figure 14:
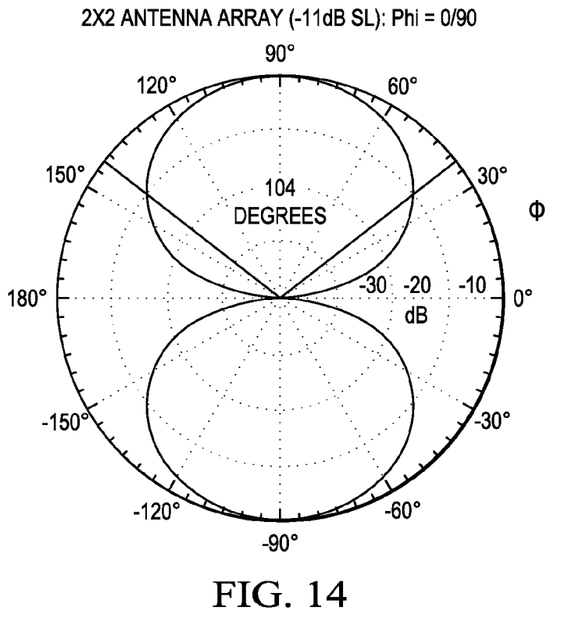
FIGS. 14-19 are radiation patterns for phased arrays for the IO circuit of FIG. 12.
Figure 15:
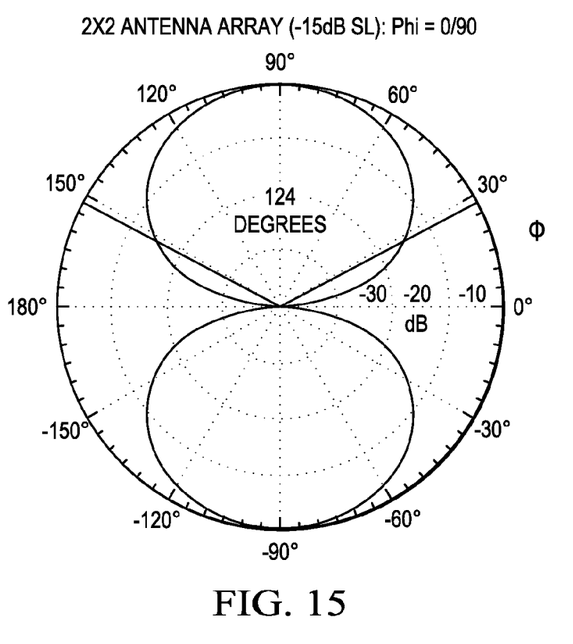
Figure 16:
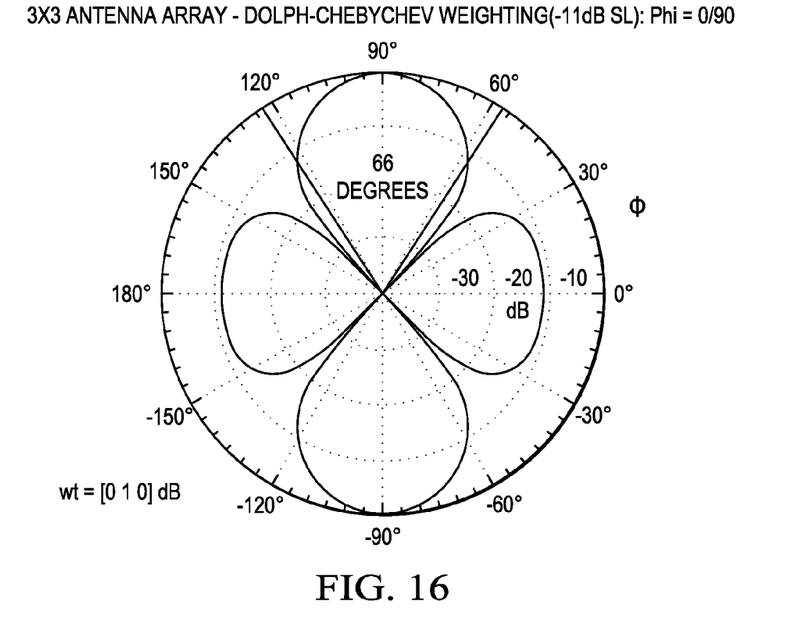
Figure 17:
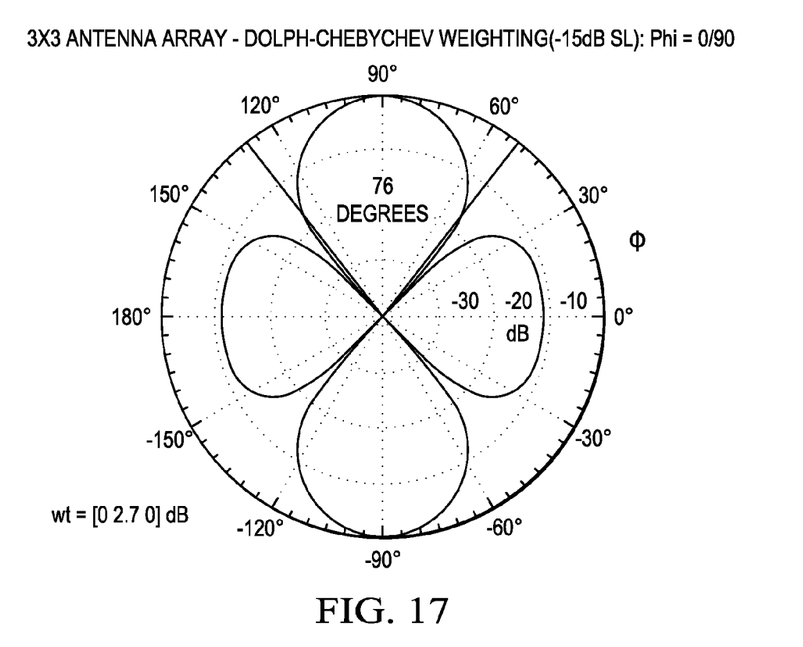
Figure 18:
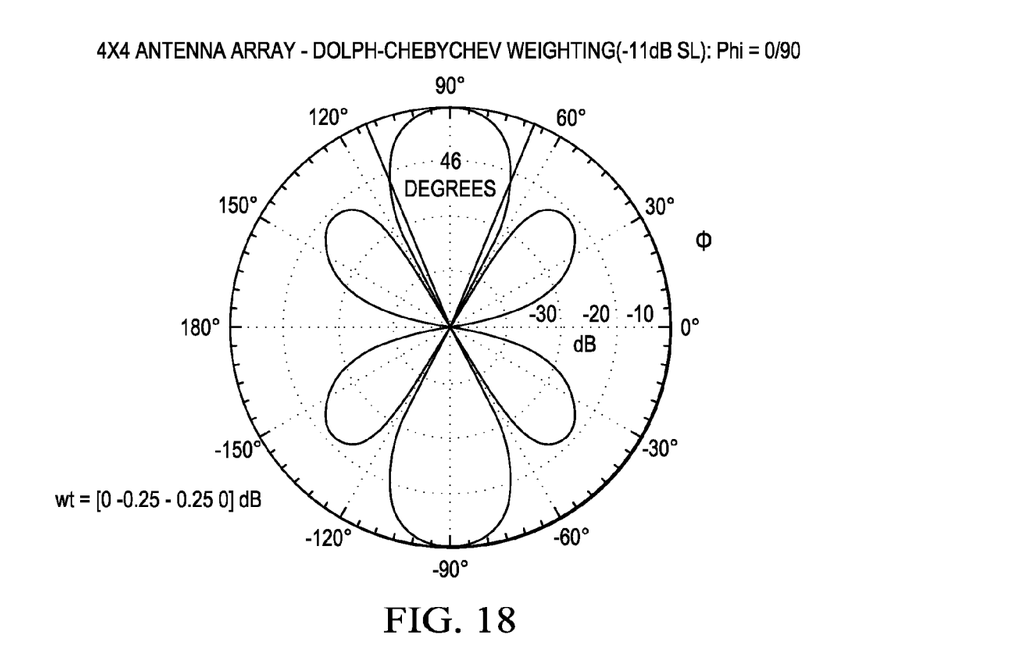
Figure 19:
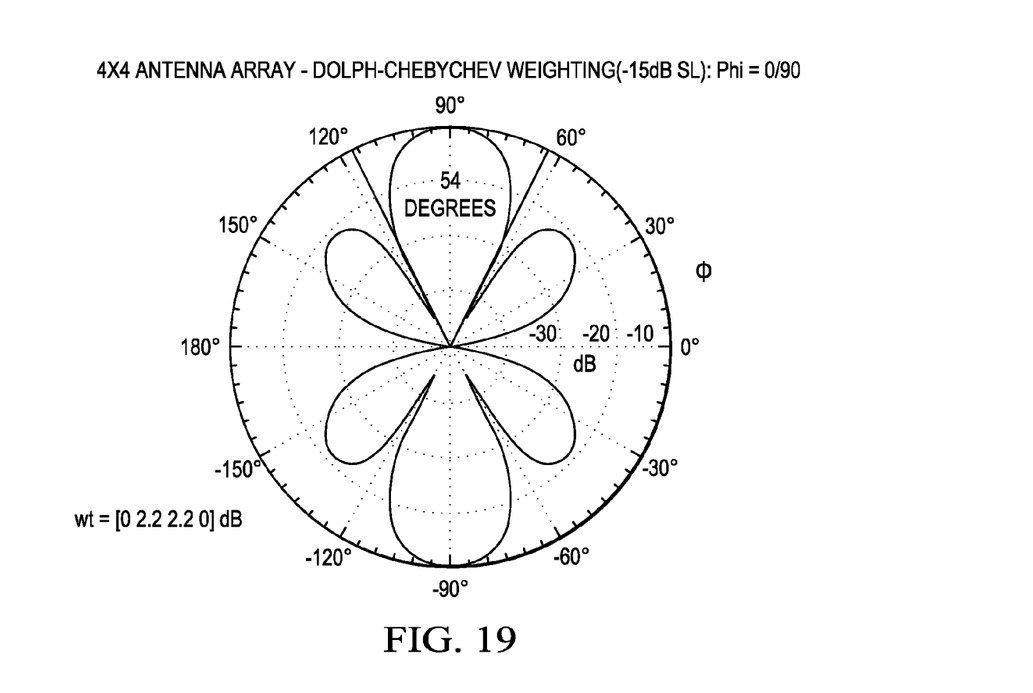

Turning to FIG. 13, an example of the antenna package 708 can be seen in greater detail. As shown, the antenna package 708 includes a phased array 804 that is substantially surrounded by a high impedance surface (HIS) 802. An example of such an HIS can be seen in U.S. patent application Ser. No. 13/116,885, which is entitled "High Impedance Surface," was filed on May 26, 2011, and is hereby incorporated by reference for all purposes. Also, as shown, the phased array 804 includes transceiver antennas 806-1 to 806-4, but any number of antennas is possible that are arranged into the four quadrants or regions. This phased array 204 can then be used to steer the beam of radiation.

Examples of the radiation patterns formed the phased array 804 can be seen in FIGS. 14-19. Specifically, the radiation patterns of FIGS. 14-19 are for phased array 804 being 2×2, 3×3, and 4×4 arrays with 4 and 16 quadrature amplitude modulation (QAM). As can be seen the lobes are significantly narrower. For the example 2×2 phased array using 4-QAM of FIG. 14, the main lobe is about 104°, and, with an antenna area of 4 mm$^2$, this would mean that the distance D1 is about 2.55-inches. For the example 2×2 phased array using 16-QAM of FIG. 15, the main lobe is about 124°, and, with an antenna area of 4 mm$^2$, this would mean that the distance D1 is about 3.75-inches. For the example 3×3 phased array using 4-QAM of FIG. 16, the main lobe is about 66°, and, with an antenna area of 9 mm$^2$, this would mean that the distance D1 is about 1.3-inches. For the example 3×3 phased array using 16-QAM of FIG. 17, the main lobe is about 76°, and, with an antenna area of 9 mm$^2$, this would mean that the distance D1 is about 1.55-inches. For the example 4×4 phased array using 4-QAM of FIG. 18, the main lobe is about 46°, and, with an antenna area of 16 mm$^2$, this would mean that the distance D1 is about 0.85-inches. For the example 4×4 phased array using 16-QAM of FIG. 19, the main lobe is about 54°, and, with an antenna area of 16 mm$^2$, this would mean that the distance D1 is about 1.0-inches.

By employing phased arrays, not only can the spacing be narrowed, but redundancy can be built in as well. Because of the configuration of router 200, some redundancy is already present. For example, if line card 202-3 were to fail and the millimeter wave transmit and receive links with line cards 202-2 and 202-4 to line card 202-3 are unavailable, routing can be performed through the waveguide 204. Assuming this failure of line card 202-3 and a packet is intended to be routed from line card 202-1 to 202-4, the packet could travel through the waveguide 204 to line card 202-N and relayed up to line card 202-4. However, with phased arrays, beam steering can be used as well to redirect links.

Figure 20:
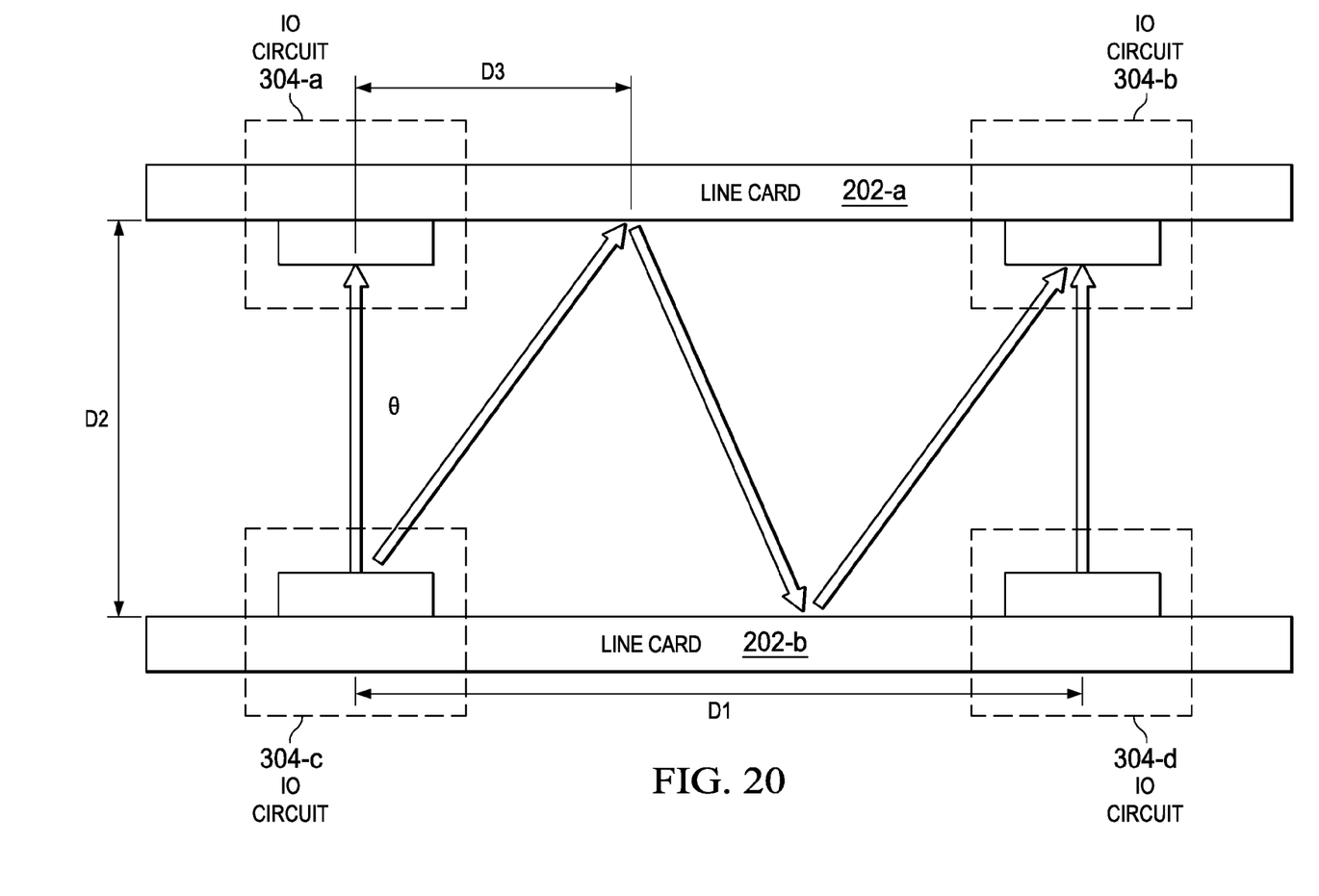
FIG. 20 is a diagram depicting system redundancy.

Turning to FIG. 20, a example of redundancy can be seen. In this example, IO circuit 304-*a* of line card 202-*a* has failed, so the transmit and receive links between IO circuit 304-*c* and 304-*a* are not functioning. Because IO circuit 304-*c* includes a phased array, it can perform beam steering and can use reflections to the nearest IO circuit (which would be IO circuit 304-*b*) using the shortest reflected path. In this example, the line cards 202-*a* and 202-*b* are separated from one another by distance D2 (which can, for example, be about 2-inches) and IO circuit pairs 304-*a*/304-*c* and 304-*b*/304-*d* are separated from one another by distance D1 (which can, for example, be about 3.75 inches). The IO circuit 304-*c* can steer the beam for its transmit link by an angle θ (about 32°, for example) from the norm, meaning that the beam would reflect off of line card 202-*a* at distance D3 (which, for example, can be 1.25-inches) and reflect off of line card 202-*b* at distance 2*D3 (which can, for example, be 2.5-inches) so as to be received by IO circuit 304-*b*. An encoding scheme (such as orthogonal frequency-division multiplexing or ODFM) can the be used so that IO circuit 304-*b* can communicate with both 304-*c* and 304-*d*.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a printed circuit board (PCB);
   a plurality of ports that are each secured to the PCB;
   a forwarding circuit that is secured to the PCB, wherein the forwarding circuit is in communication with each of the plurality of ports; and
   a plurality of input/output (IO) circuits, wherein each IO circuit is secured to the PCB and is in communication with the forwarding circuit, and wherein each IO circuit is configured to provide a millimeter wave link in a direction extending from the PCB, and wherein the plurality of IO circuits are arranged on the PCB and spaced apart from one another so as to isolate each millimeter wave link;
   wherein the forwarding circuit is in communication with the plurality of ports by a first set of serializer/deserializer (SerDes) links, and wherein the forwarding circuit is in communication with the plurality of IO circuits by a second set of SerDes links;
   wherein the PCB further comprises a top surface and a bottom surface, and wherein the millimeter wave link for each IO circuit further comprises:
   a first transmit link that is configured to transmit data to a receiver facing the top surface of the PCB;
   a first receive link that is configured to receive data from a transmitter facing the top surface of the PCB;
   a second transmit link is configured to transmit data to a receiver facing the bottom surface of the PCB; and
   a second receive link that is configured to receive data from a transmitter facing the bottom surface of the PCB;
   wherein each IO circuit further comprises a transceiver that is secured to the top surface of the PCB, that is communication with the forwarding circuit, and that provides the first transmit link and the first receive link; and
   wherein the PCB further comprises a plurality of radio frequency (RF) windows, wherein each RF window is substantially aligned with the transceiver from at least one of the IO circuits so that the transceiver provides the second transmit link and the second receive link.

2. An apparatus comprising:
   a chassis having a first slot and a second slot;
   a first active card that is secured to the first slot, wherein the first active card includes:
   a first printed circuit board (PCB);
   a first set of ports that are each secured to the first PCB;
   a first forwarding circuit that is secured to the first PCB, wherein the first forwarding circuit is in communication with each port from the first set of ports; and
   a first set of IO circuits, wherein each IO circuit from the first set is secured to the first PCB and is in communication with the first forwarding circuit, and wherein the first set of IO circuits are arranged on the first PCB and spaced apart from one another by at least a first distance; and
   a second active card that is secured to the second slot and that is separated from the first active card by a second distance, wherein the second active card includes:
   a second PCB;
   a second set of ports that are each secured to the second PCB;
   a second forwarding circuit that is secured to the second PCB, wherein the second forwarding circuit is in communication with each port from the second set of ports; and
   a second set of IO circuits, wherein each IO circuit from the second set is secured to the second PCB and is in communication with the second forwarding circuit, and wherein the second set of IO circuits are arranged on the second PCB and spaced apart from one another by at least the first distance, and wherein each IO circuit from the first set is substantially aligned with an IO circuit from the second set so as to provide a millimeter wave link between each pair of aligned IO circuits, and wherein the first distance and the second distance are sufficiently large to isolate the millimeter wave link between each pair of IO circuits;
   wherein the chassis further comprises:
   a rack that includes the first and second slots; and
   a routing processor that is in communication with the first and second forwarding circuits;
   wherein the first forwarding circuit is in communication with the first set of ports by a first set of serializer/deserializer (SerDes) links, and wherein the first forwarding circuit is in communication with the first set of IO circuits by a second set of SerDes links, and wherein the second forwarding circuit is in communication with the second set of ports by a third set of SerDes links, and wherein the second forwarding circuit is in communication with the second set of IO circuits by a fourth set of SerDes links;
   wherein the each of the first and second PCBs further comprises a top surface and a bottom surface, and wherein the millimeter wave link for each pair of aligned 10 circuits further comprises a transmit link and a receive link;
   wherein each IO circuit from the first and second sets further comprises a transceiver that is secured to the top surface of its PCB and that is communication with its forwarding circuit; and
   wherein the bottom surface of the first PCB faces the top surface of the second PCB, and wherein the first PCB further comprises a plurality of RF windows, and wherein each RF window is substantially aligned with the transceiver from at least one of the IO circuits from the first set.

* * * * *